US008635538B2

(12) United States Patent
Chae (10) Patent No.: US 8,635,538 B2
(45) Date of Patent: Jan. 21, 2014

(54) DISPLAY APPARATUS AND INFORMATION UPDATE METHOD THEREOF

(75) Inventor: Myeoung-soo Chae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1385 days.

(21) Appl. No.: 11/934,851

(22) Filed: Nov. 5, 2007

(65) Prior Publication Data

US 2008/0109765 A1 May 8, 2008

(30) Foreign Application Priority Data

Nov. 3, 2006 (KR) .................. 10-2006-0108582

(51) Int. Cl.
*G06F 3/00* (2006.01)
(52) U.S. Cl.
USPC ........... 715/749; 715/735; 715/736; 715/740; 715/741; 715/748; 715/772; 715/866
(58) Field of Classification Search
USPC ......... 715/718, 866, 719, 735, 736, 740, 741, 715/748, 749, 772
See application file for complete search history.

(56) References Cited

U.S. PATENT DOCUMENTS

| 4,866,600 | A | * | 9/1989 | Ballard et al. ................. 715/719 |
| 4,872,167 | A | * | 10/1989 | Maezawa et al. .......... 714/38.13 |
| 5,191,648 | A | * | 3/1993 | Ikenoue et al. ............... 709/208 |
| 5,251,295 | A | * | 10/1993 | Ikenoue et al. ............... 345/504 |
| 5,729,735 | A | * | 3/1998 | Meyering ............................... 1/1 |
| 5,856,975 | A | * | 1/1999 | Rostoker et al. ......... 370/395.64 |
| 5,905,521 | A | * | 5/1999 | Gatto et al. ...................... 725/95 |
| 6,046,760 | A | * | 4/2000 | Jun ................................ 725/100 |
| 6,047,380 | A | * | 4/2000 | Nolan et al. ................... 713/324 |
| 6,100,887 | A | * | 8/2000 | Bormann et al. ............. 715/764 |
| 6,115,009 | A | * | 9/2000 | Ikegami .......................... 345/10 |
| 6,128,733 | A | * | 10/2000 | Miyaguchi et al. ............... 713/2 |
| 6,272,333 | B1 | * | 8/2001 | Smith ........................... 455/418 |

(Continued)

FOREIGN PATENT DOCUMENTS

| JP | 02230448 | A | * | 9/1990 | ............. G06F 13/00 |
| JP | 2005-259114 | A | | 9/2005 | |

(Continued)

OTHER PUBLICATIONS

Bing search q=controller+automatic+update+progra Sep. 9, 2013.*

(Continued)

*Primary Examiner* — Boris Pesin
*Assistant Examiner* — John Heffington
(74) *Attorney, Agent, or Firm* — Sughrue Mion, PLLC (57) ABSTRACT

A display apparatus includes: a displaying unit; a signal processing unit which performs signal processing for displaying images on the displaying unit; a first controlling unit which controls the signal processing unit to perform signal processing; a first storing unit which saves a first control program for operating the first controlling unit; a connecting unit to which an outer storing apparatus is connected; and a second controlling unit which compares reference information related to the first control program saved in the first storing unit with reference information related to a first control program saved in the outer storing apparatus, and updates the first control program saved in the first storing unit to the first control program which is saved in the outer storing apparatus and received through the connecting unit if the first control program saved in the first storing unit needs to be updated.

19 Claims, 5 Drawing Sheets

(56) References Cited

U.S. PATENT DOCUMENTS

| | | | | |
|---|---|---|---|---|
| 6,347,344 | B1* | 2/2002 | Baker et al. | 710/20 |
| 6,353,460 | B1* | 3/2002 | Sokawa et al. | 348/555 |
| 6,442,067 | B1* | 8/2002 | Chawla et al. | 365/185.11 |
| 6,463,501 | B1* | 10/2002 | Kern et al. | 711/100 |
| 6,639,687 | B1* | 10/2003 | Neilsen | 358/1.14 |
| 6,725,260 | B1* | 4/2004 | Philyaw | 709/220 |
| 6,930,785 | B1* | 8/2005 | Weyand et al. | 358/1.1 |
| 6,961,429 | B1* | 11/2005 | Hill et al. | 380/200 |
| 6,967,565 | B2* | 11/2005 | Lingemann | 340/12.23 |
| 6,967,744 | B1* | 11/2005 | Kawamoto | 358/1.9 |
| 6,987,991 | B2* | 1/2006 | Nelson | 455/566 |
| 7,047,196 | B2* | 5/2006 | Calderone et al. | 704/270.1 |
| 7,050,109 | B2* | 5/2006 | Safadi et al. | 348/468 |
| 7,061,493 | B1* | 6/2006 | Cook et al. | 345/473 |
| 7,117,444 | B2* | 10/2006 | Takao et al. | 715/740 |
| 7,124,210 | B1* | 10/2006 | Dinwiddie et al. | 710/16 |
| 7,167,731 | B2* | 1/2007 | Nelson | 455/566 |
| 7,174,306 | B1* | 2/2007 | Haseltine | 705/26.35 |
| 7,225,251 | B2* | 5/2007 | Suzuki | 709/224 |
| 7,290,164 | B1* | 10/2007 | Harvey et al. | 714/2 |
| 7,403,792 | B2* | 7/2008 | Takahashi | 455/550.1 |
| 7,421,478 | B1* | 9/2008 | Muchow | 709/209 |
| 7,443,283 | B2* | 10/2008 | Schmandt et al. | 340/407.1 |
| 7,447,996 | B1* | 11/2008 | Cox et al. | 715/758 |
| 7,523,097 | B1* | 4/2009 | Wilson et al. | 1/1 |
| 7,574,706 | B2* | 8/2009 | Meulemans et al. | 717/174 |
| 7,587,467 | B2* | 9/2009 | Hesselink et al. | 709/214 |
| 7,721,216 | B2* | 5/2010 | Zaner et al. | 715/758 |
| 7,778,948 | B2* | 8/2010 | Johnson et al. | 706/45 |
| 7,783,982 | B1* | 8/2010 | Reynolds et al. | 715/747 |
| 7,814,081 | B2* | 10/2010 | Futagawa | 707/703 |
| 7,860,705 | B2* | 12/2010 | Afify et al. | 704/3 |
| 8,010,474 | B1* | 8/2011 | Bill | 706/46 |
| 8,175,929 | B2* | 5/2012 | Haseltine | 705/26.35 |
| 8,473,441 | B2* | 6/2013 | Bill | 706/46 |
| 2001/0008024 | A1* | 7/2001 | Inaba | 717/11 |
| 2002/0120885 | A1 | 8/2002 | Choi et al. | |
| 2002/0121913 | A1* | 9/2002 | Miller et al. | 324/760 |
| 2003/0105987 | A1* | 6/2003 | Gilbert et al. | 714/6 |
| 2003/0132941 | A1* | 7/2003 | Echizenya | 345/520 |
| 2003/0189562 | A1 | 10/2003 | Tsai | |
| 2003/0193504 | A1* | 10/2003 | Cook et al. | 345/473 |
| 2003/0202006 | A1* | 10/2003 | Callway | 345/719 |
| 2003/0231102 | A1* | 12/2003 | Fisher | 340/5.73 |
| 2003/0231103 | A1* | 12/2003 | Fisher | 340/5.73 |
| 2003/0233650 | A1* | 12/2003 | Zaner et al. | 725/32 |
| 2004/0018858 | A1* | 1/2004 | Nelson | 455/566 |
| 2004/0019789 | A1* | 1/2004 | Buer | 713/170 |
| 2004/0030877 | A1* | 2/2004 | Frid | 713/1 |
| 2004/0064488 | A1* | 4/2004 | Sinha | 707/204 |
| 2004/0133888 | A1* | 7/2004 | Ard et al. | 717/174 |
| 2004/0187103 | A1* | 9/2004 | Wickham et al. | 717/168 |
| 2004/0225874 | A1* | 11/2004 | Burr et al. | 713/1 |
| 2004/0243691 | A1* | 12/2004 | Viavant et al. | 709/220 |
| 2004/0261071 | A1* | 12/2004 | Chuang et al. | 717/174 |
| 2005/0027669 | A1* | 2/2005 | Day et al. | 707/1 |
| 2005/0027839 | A1* | 2/2005 | Day et al. | 709/223 |
| 2005/0027966 | A1* | 2/2005 | Hu et al. | 712/36 |
| 2005/0038927 | A1* | 2/2005 | Choi et al. | 710/8 |
| 2005/0080801 | A1* | 4/2005 | Kothandaraman et al. | 707/100 |
| 2005/0137015 | A1* | 6/2005 | Rogers et al. | 463/42 |
| 2005/0138068 | A1* | 6/2005 | Wilbur et al. | 707/104.1 |
| 2005/0184875 | A1* | 8/2005 | Schmandt et al. | 340/573.1 |
| 2005/0223373 | A1* | 10/2005 | Gage et al. | 717/168 |
| 2005/0246702 | A1* | 11/2005 | Yeh et al. | 717/170 |
| 2005/0283414 | A1* | 12/2005 | Fernandes et al. | 705/34 |
| 2006/0026165 | A1* | 2/2006 | Mohamed et al. | 707/10 |
| 2006/0064421 | A1* | 3/2006 | Futagawa | 707/10 |
| 2006/0075001 | A1* | 4/2006 | Canning et al. | 707/203 |
| 2006/0075055 | A1* | 4/2006 | Littlefield | 709/206 |
| 2006/0077205 | A1* | 4/2006 | Guymon et al. | 345/473 |
| 2006/0079293 | A1* | 4/2006 | Nelson | 455/566 |
| 2006/0079970 | A1* | 4/2006 | Ward | 700/86 |
| 2006/0085404 | A1* | 4/2006 | Kusunoki | 707/3 |
| 2006/0089135 | A1* | 4/2006 | Takahashi | 455/419 |
| 2006/0101093 | A1* | 5/2006 | Nakamura | 707/203 |
| 2006/0117259 | A1* | 6/2006 | Nam et al. | 715/719 |
| 2006/0123127 | A1* | 6/2006 | Littlefield | 709/229 |
| 2006/0133828 | A1* | 6/2006 | Rommelmann et al. | 399/8 |
| 2006/0170945 | A1* | 8/2006 | Bill | 358/1.13 |
| 2006/0173975 | A1* | 8/2006 | Nose et al. | 709/219 |
| 2007/0002057 | A1* | 1/2007 | Danzig et al. | 345/473 |
| 2007/0021973 | A1* | 1/2007 | Stremler | 705/1 |
| 2007/0050716 | A1* | 3/2007 | Leahy et al. | 715/706 |
| 2007/0055750 | A1* | 3/2007 | Wang et al. | 709/219 |
| 2007/0082738 | A1* | 4/2007 | Fickie et al. | 463/42 |
| 2007/0118683 | A1* | 5/2007 | Yang et al. | 711/103 |
| 2007/0127508 | A1* | 6/2007 | Bahr et al. | 370/401 |
| 2007/0206017 | A1* | 9/2007 | Johnson et al. | 345/473 |
| 2007/0218987 | A1* | 9/2007 | Van Luchene et al. | 463/30 |
| 2007/0233839 | A1* | 10/2007 | Gaos | 709/223 |
| 2007/0234403 | A1* | 10/2007 | Pipal et al. | 726/2 |
| 2007/0239826 | A1* | 10/2007 | Ducheneaut et al. | 709/204 |
| 2007/0240119 | A1* | 10/2007 | Ducheneaut et al. | 717/124 |
| 2007/0240146 | A1* | 10/2007 | Chinnadurai et al. | 717/168 |
| 2007/0252554 | A1* | 11/2007 | Feng et al. | 320/116 |
| 2007/0253261 | A1* | 11/2007 | Uchida et al. | 365/189.05 |
| 2007/0255807 | A1* | 11/2007 | Hayashi et al. | 709/219 |
| 2007/0255831 | A1* | 11/2007 | Hayashi et al. | 709/226 |
| 2007/0256016 | A1* | 11/2007 | Bedingfield | 715/719 |
| 2007/0288598 | A1* | 12/2007 | Edeker et al. | 709/217 |
| 2008/0027567 | A1* | 1/2008 | Philyaw | 700/40 |
| 2008/0039052 | A1* | 2/2008 | Knowles | 455/412.1 |
| 2008/0046881 | A1* | 2/2008 | Braghiroli | 717/173 |
| 2008/0057877 | A1* | 3/2008 | Pinder | 455/75 |
| 2008/0058962 | A1* | 3/2008 | Ward | 700/17 |
| 2008/0059147 | A1* | 3/2008 | Afify et al. | 704/5 |
| 2008/0065650 | A1* | 3/2008 | Kim et al. | 707/10 |
| 2008/0082933 | A1* | 4/2008 | Howard et al. | 715/771 |
| 2008/0086652 | A1* | 4/2008 | Krieger et al. | 713/330 |
| 2008/0091692 | A1* | 4/2008 | Keith et al. | 707/100 |
| 2008/0098131 | A1* | 4/2008 | Onishi | 710/7 |
| 2008/0098444 | A1* | 4/2008 | Shikata et al. | 725/110 |
| 2008/0163089 | A1* | 7/2008 | Altieri | 715/764 |
| 2008/0189458 | A1* | 8/2008 | Deshpande et al. | 710/110 |
| 2008/0208973 | A1* | 8/2008 | Hayashi et al. | 709/204 |
| 2008/0214214 | A1* | 9/2008 | Reissmueller et al. | 455/466 |
| 2008/0216100 | A1* | 9/2008 | Li et al. | 719/330 |
| 2008/0256170 | A1* | 10/2008 | Hayashi et al. | 709/201 |
| 2008/0280684 | A1* | 11/2008 | McBride et al. | 463/42 |
| 2008/0284777 | A1* | 11/2008 | Altieri | 345/418 |
| 2009/0013049 | A1* | 1/2009 | Alexander | 709/206 |
| 2009/0064052 | A1* | 3/2009 | Mihalcheon | 715/850 |
| 2009/0109959 | A1* | 4/2009 | Elliott et al. | 370/352 |
| 2009/0177980 | A1* | 7/2009 | Leahy et al. | 715/757 |
| 2009/0183089 | A1* | 7/2009 | Leahy et al. | 715/757 |
| 2009/0198824 | A1* | 8/2009 | Taylor | 709/230 |
| 2009/0204979 | A1* | 8/2009 | Machida | 719/321 |
| 2009/0222619 | A1* | 9/2009 | Deng et al. | 711/103 |
| 2009/0228809 | A1* | 9/2009 | Leahy et al. | 715/757 |
| 2010/0095322 | A1* | 4/2010 | Gordon et al. | 725/30 |
| 2010/0125770 | A1* | 5/2010 | Keith, Jr. | 714/752 |
| 2010/0257460 | A1* | 10/2010 | Zaner et al. | 715/753 |
| 2011/0013881 | A1* | 1/2011 | Itani | 386/230 |

FOREIGN PATENT DOCUMENTS

| | | |
|---|---|---|
| KR | 10-2004-0018678 A | 3/2004 |
| KR | 10-2004-0058450 A | 7/2004 |
| KR | 10-2004-0110700 A | 12/2004 |
| KR | 10-2006-0035287 A | 4/2006 |
| KR | 10-2006-0052523 A | 5/2006 |
| KR | 10-2006-0084223 A | 7/2006 |
| KR | 10-2006-0092575 A | 8/2006 |
| KR | 10-2008-0010205 A | 1/2008 |

OTHER PUBLICATIONS

Bing search q=controller+storage+automatic+updat Sep. 9, 2013.*
Tokunaga et al, Remote Driven Remote File Update, Apr. 1, 1997, IBM.*
Guide to Electronic Terms and Acronyms, Apr. 27, 2005, KSB Elecronics Limited.*

(56) References Cited

OTHER PUBLICATIONS

*"Philips LCD TV—Philips User Manual"* Dec. 19, 2005, [Online] Dec. 19, 2005, pp. 1-50, XP002530531. Retrieved from the Internet: URL:http://www.p4c.philips.com/files/3/32pf9630a_37/32pf9630a_37_dfu_aen.pdf> [retrieved on Jun. 18, 2009].

Korean Office Action, dated Jan. 19, 2011, issued in Application No. 10-2006-0108582.

Communication dated Mar. 15, 2011, issued by the State Intellectual Property Office of P.R. China in corresponding Chinese Patent Application No. 200710166523.3.

* cited by examiner

DISPLAY APPARATUS AND INFORMATION UPDATE METHOD THEREOF

CROSS-REFERENCE TO RELATED APPLICATIONS

This application claims priority from Korean Patent Application No. 2006-0108582, filed on Nov. 3, 2006 in the Korean Intellectual Property Office, the disclosure of which is incorporated herein by reference.

BACKGROUND OF INVENTION

1. Field of Invention

Apparatuses and methods consistent with the present invention relate to a display apparatus, and more particularly, to a display apparatus receiving a control program.

2. Description of the Related Art

A display apparatus displays images on the basis of image signals. To perform image processing, the display apparatus requires a number of control programs such as a driver and algorithms. Also, a micro controller provided in the display apparatus performs image processing using the control programs.

The micro controller performing the image processing is divided into a master micro controller and a slave micro controller to perform the image processing more effectively by performing different processing respectively. Also, the control programs which are used for operation of the micro controller need to be updated for enhancement in their performance.

Figure 1:
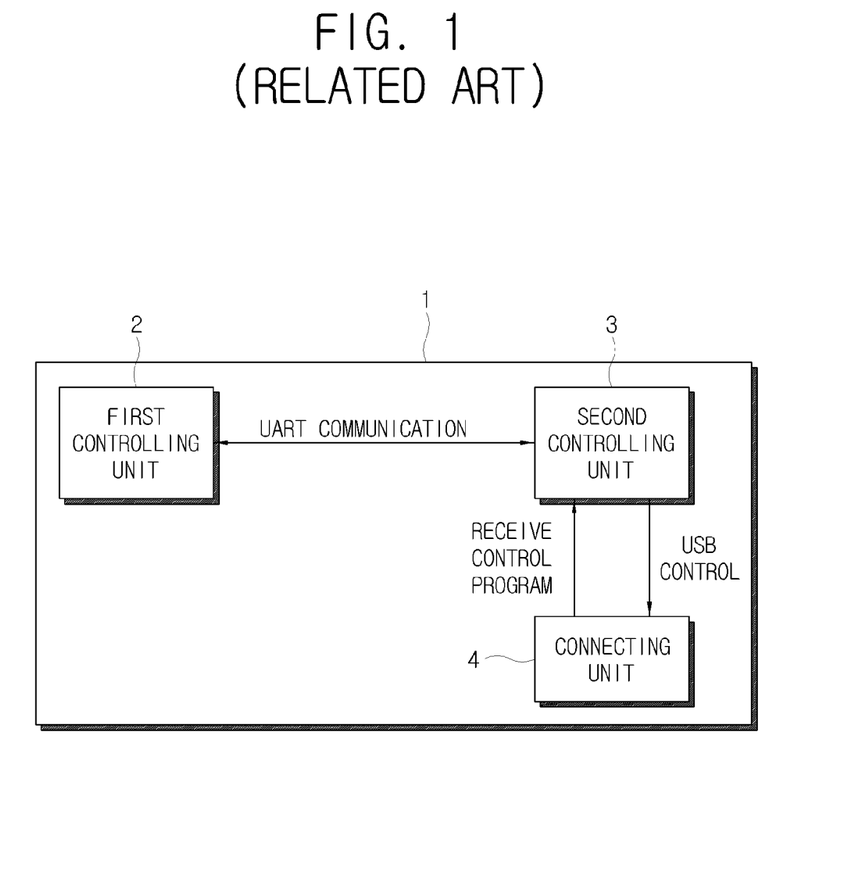
FIG. 1 is a block diagram to explain a process for saving a control program in a related art display apparatus.

A process for updating the control program in a related art display apparatus 1 is shown in FIG. 1. As shown in FIG. 1, according to the related art display apparatus 1, a second controlling unit 3 corresponding to the slave micro controller receives a control program, which is saved in an outer storing apparatus, through a connecting unit 4, and transmits the control program to a first controlling unit 2 corresponding to the master micro controller using universal asynchronous receiver/transmitter (UART) communication.

However, by the UART communication, it is impossible to receive information about whether the control program is needed for the master micro controller. Therefore, as the slave micro controller cannot identify if the control program saved in the outer storing apparatus is needed for the master micro controller, it is impossible to appropriately update the control program.

SUMMARY OF THE INVENTION

Accordingly, it is an aspect of the present invention to provide a display apparatus which is relayed control program information needed for a master micro controller and receives an appropriate control program from an outer storing apparatus to perform an update, and an information update method thereof.

Another aspect of the present invention is to provide a display apparatus which receives control programs required for a master micro controller and a slave micro controller through a single connecting unit, so that the control programs can be easily updated without disassembling the display apparatus, and an information update method thereof.

Additional aspects of the present invention will be set forth in part in the description which follows and, in part, will be obvious from the description, or may be learned by practice of the present invention.

According to an aspect of the present invention, there is provided a display apparatus comprising: a displaying unit; a signal processing unit which performs signal processing for displaying images on the displaying unit; a first controlling unit which controls the signal processing unit to perform signal processing; a first storing unit which saves a first control program for operating the first controlling unit; a connecting unit to which an outer storing apparatus is connected; and a second controlling unit which compares reference information related to the first control program saved in the first storing unit with reference information related to a first control program saved in the outer storing apparatus, and updates the first control program saved in the first storing unit to the first control program which is saved in the outer storing apparatus and received through the connecting unit if the first control program saved in the first storing unit needs to be updated.

The second controlling unit may receive the reference information related to the first control program from the first controlling unit by Inter Integrated Circuit (IIC) communication.

The display apparatus may further comprise a user inputting unit, wherein if the second controlling unit receives an input for updating the first control program saved in the first storing unit through the user inputting unit, the second controlling unit updates the first control program saved in the first storing unit to the first control program saved in the outer storing apparatus.

The display apparatus may further comprise a user interface (UI) generating unit which generates a UI for updating the first control program, wherein the second controlling unit receives an update command for the first control program saved in the first storing unit through the UI.

The UI generating unit may further generate a UI which indicates update status of the first control program, and the second controlling unit controls to receive the update command for the first control program from the user inputting unit through the UI which indicates the update status.

The display apparatus may further comprise a second storing unit, wherein the second controlling unit compares the reference information related to a second control program saved in the second storing unit with the reference information related to a second control program saved in the outer storing apparatus, and updates the second control program saved in the second storing unit to the second control program of the outer storing apparatus received through the connecting unit if the second control program saved in the second storing unit needs to be updated.

A protocol for the connecting unit to receive the first control program and the second control program may comprise a universal serial bus (USB) protocol.

According to another aspect of the present invention, there is provided a display apparatus comprising: a displaying unit; a signal processing unit which performs signal processing for displaying images on the displaying unit; a first controlling unit which controls the signal processing unit to perform signal processing; a first storing unit which saves a first control program for operating the first controlling unit; a connecting unit to which an outer storing apparatus is connected; and a second controlling unit which receives a selection command for the first control program saved in the first storing unit, and updates the selected first control program into the first control program which is in the outer storing apparatus and received through the connecting unit.

The second controlling unit may receive a reference information related to the first control program from the first controlling unit by Inter Integrated Circuit (IIC) communication.

The display apparatus may further comprise a user inputting unit, wherein the second controlling unit receives the selection command for the first control program saved in the first storing unit through the user inputting unit, and updates the selected first control program into the first control program saved in the outer storing apparatus.

The display apparatus may further comprise a UI generating unit generating a UI for selecting the first control program, wherein the second controlling unit updates the first control program selected through the UI among the first control programs saved in the first storing unit.

The UI generating unit may further generate a UI which indicates update status of the first control program, and the second controlling unit updates the first control program selected from the UI which indicates the update status.

The display apparatus may further comprise a second storing unit, wherein the second controlling unit compares the reference information related to a second control program saved in the second storing unit with the reference information related to a second control program saved in the outer storing apparatus, and updates the second control program saved in the second storing unit into the second control program which is in the outer storing apparatus and received through the connecting unit if the second control program saved in the second storing unit needs to be updated.

A protocol for the connecting unit to receive the first control program and the second control program may comprise a USB protocol.

According to still another aspect of the present invention there is provided an information update method of a display apparatus comprising a displaying unit, a signal processing unit which performs signal processing for displaying images on the displaying unit, and a first controlling unit which controls the signal processing unit, the method comprising: being connected to an outer storing apparatus; receiving a reference information of a first control program saved in the outer storing apparatus; comparing a reference information related to a first control program saved in the first storing unit with the reference information of the first control information saved in the outer storing apparatus; determining whether the saved first control program needs to be updated as a result of the comparing; receiving the first control program saved in the outer storing apparatus if the first control program needs to be updated; and updating the saved first control program into the received first control program.

Comparing reference information may further comprise receiving the reference information related to the first control program from the first controlling unit by Inter Integrated Circuit (IIC) communication.

Updating the first control program may comprise updating the saved first control program into the first control program saved in the outer storing apparatus if there is an input for updating the saved first control program from a user.

Determining the necessity to update may further comprise indicating update status of the first control program.

A protocol for receiving the first control program may comprise a USB protocol.

According to still another aspect of the present invention, there is provided an information update method of a display apparatus comprising a displaying unit, a signal processing unit which performs signal processing for displaying images on the displaying unit, and a first storing unit which saves a first control program for operating a first controlling unit which controls the signal processing unit, the method comprising: being connected to an outer storing apparatus; receiving a selection command for the first control program saved in the first storing unit from a user; and updating the selected first control program into the first control program saved in the outer storing apparatus.

The information update method of a display apparatus may further comprise receiving the reference information related to the first control program from the first controlling unit by IIC communication.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 2:
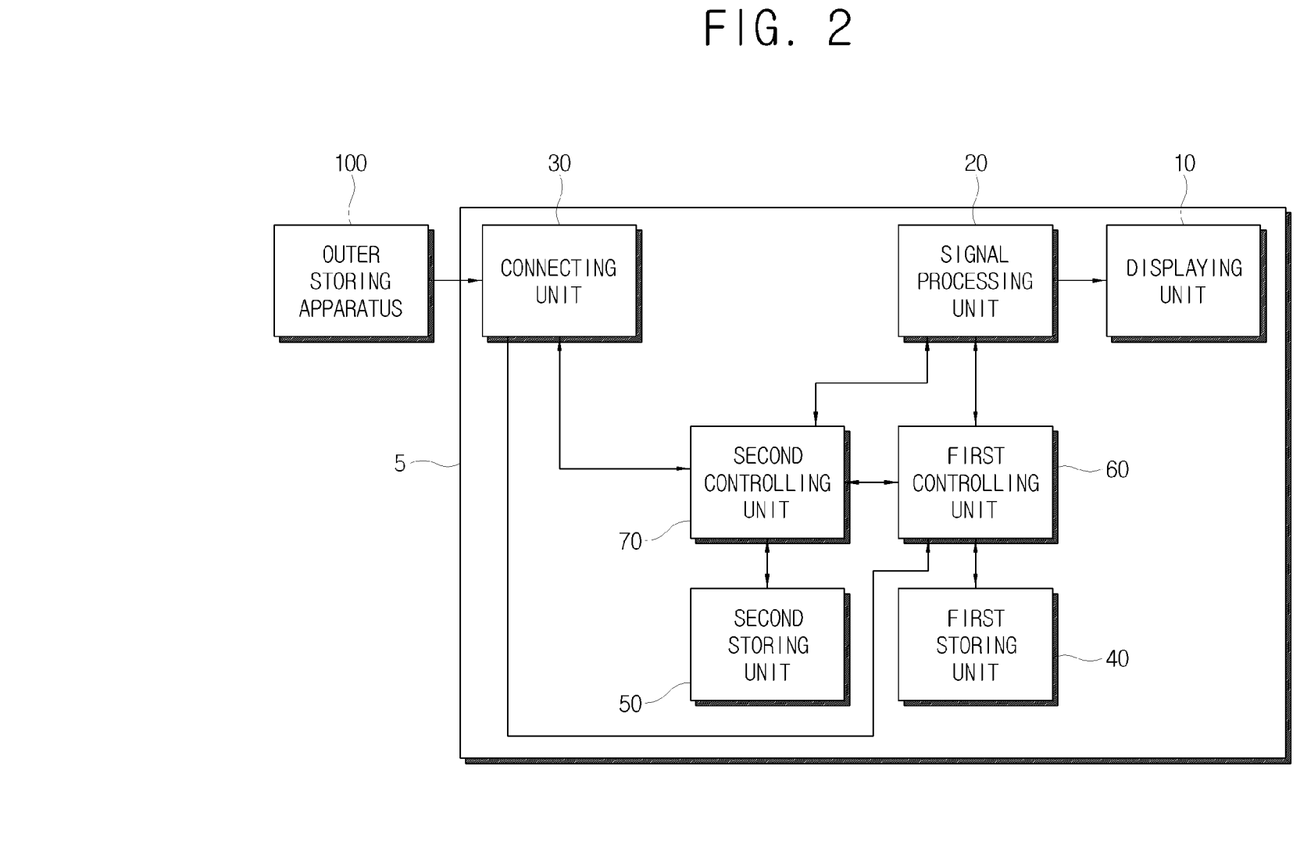
FIG. 2 and FIG. 3 are block diagrams to explain a configuration of a display apparatus according to an exemplary embodiment of the present invention.

As shown in FIG. 2, a display apparatus 5 according to an exemplary embodiment of the present invention comprises a displaying unit 10, a signal processing unit 20, a connecting unit 30, a first storing unit 40, a second storing unit 50, a first controlling unit 60, and a second controlling unit 70. The display apparatus may be a digital television (TV) or others known devices in the art.

The displaying unit 10 displays images on the basis of image signals processed by the signal processing unit 20. The displaying unit 10 may be a cathode ray tube (CRT), a liquid crystal display (LCD), a plasma display panel (PDP), a digital light processing (DLP) device, a surface-conduction electron-emitter display (SED), a field emission display (FED) or other known displays in the art.

The signal processing unit 20 performs image processing for displaying the images on the displaying unit 10. Also, the signal processing unit 20 receives a UI image generated by a UI generating unit 90 to be described later, according to control of the second controlling unit 70, and generates images having the UI image to display on the displaying unit 10.

On the other hand, the signal processing unit 20 may perform decoding for extracting image information from inputted image signals, scaling for adjusting resolution of the decoded images according to characteristics of the display apparatus 10 and a user's setting, and picture enhancement for enhancing quality of the images.

Also, the signal processing unit 20 may be included in the first controlling unit 60 or the second controlling unit 70 to be described later as required.

The first storing unit 40 and the second storing unit 50 may be embodied by a non-volatile memory like flash memory, and saves various information for operation of the signal processing unit 20, a first control program and a second control program which are used for operation of the first controlling unit 60 and the second controlling unit 70 respectively. The first storing unit 40 and the second storing unit 50 may save micro controller unit (MCU) code data. Also, the first storing unit 40 and the second storing unit 50 may be provided in the first controlling unit 60 and the second controlling unit 70 respectively.

Also, the first control program and the second control program which are saved in the first storing unit 40 and the second storing unit 50, respectively, may be plural as well as singular. If the control programs are plural, the user may select a control program to be updated.

The connecting unit 30 is connected to an outer storing apparatus 100 which saves the first control program and the second control program, and may receive at least one of the first control program and the second control program from the outer storing apparatus 100 according to control of the second controlling unit 70. The connecting unit 30 may receive the control program according to USB protocol.

The first controlling unit 60 controls the signal processing unit 20 to perform predetermined signal processing for displaying images on the displaying unit 10. The first controlling unit 60 controls the signal processing unit 20 according to the first control program saved in the first storing unit 40, and may be embodied by a master micro controller.

The second controlling unit 70 compares reference information related to the first control program saved in the first storing unit 40 with a reference information related to the first control program saved in the outer storing apparatus 100. Thus, if the first control program saved in the first storing unit 40 is required to be updated, the second controlling unit 70 updates the first control program saved in the first storing unit 40 to the first control program saved in the outer storing apparatus 100. The second controlling unit 70 may be a slave micro controller. The second controlling unit 70 may receive the reference information of the first control program saved in the first storing unit 40 from the first controlling unit 60 by IIC communication.

Here, the reference information of the control program may be a version of a driver or a firmware for operating the first controlling unit 60. The second controlling unit 70 compares the version of the first control program saved in the outer storing apparatus 100 with the version of the first control program saved in the first storing unit 40. Then, if the version of the first control program saved in the outer storing apparatus 100 is higher, the second controlling unit 70 receives the first control program saved in the outer storing apparatus 100 through the connecting unit 30 and transmits the received first control program to the first storing unit 40 through the first controlling unit 60, thus rapidly and accurately performing the update of the first control program.

It is preferable but not necessary that if the outer storing apparatus 100 is connected to the connecting unit 30, the second control program 70 extracts only the reference information of the first control program saved in the outer storing apparatus 100 and compares it with the reference information of the first control program saved in the first storing unit 40, thus receiving the first control program from the outer storing apparatus 100 through the connecting unit 30 if it determines that the update is required.

Also, it is available that if there is an input for updating the first control program by the user, the second controlling unit 70 receives the first control program from the outer storing apparatus 100 and updates the first control program saved in the first storing unit 40 to the received first control program irrespective of the reference information of the first control program.

Also, it is available that the second controlling unit 70 further saves a second control program for operating the second controlling unit 70 in the second storing unit 50, thus if the outer storing apparatus 100 saving the second control program is connected to the connecting unit 30, the second controlling unit 70 receives the second control program from the outer storing apparatus 100 and updates the second control program saved in the second storing unit 50.

Figure 3:
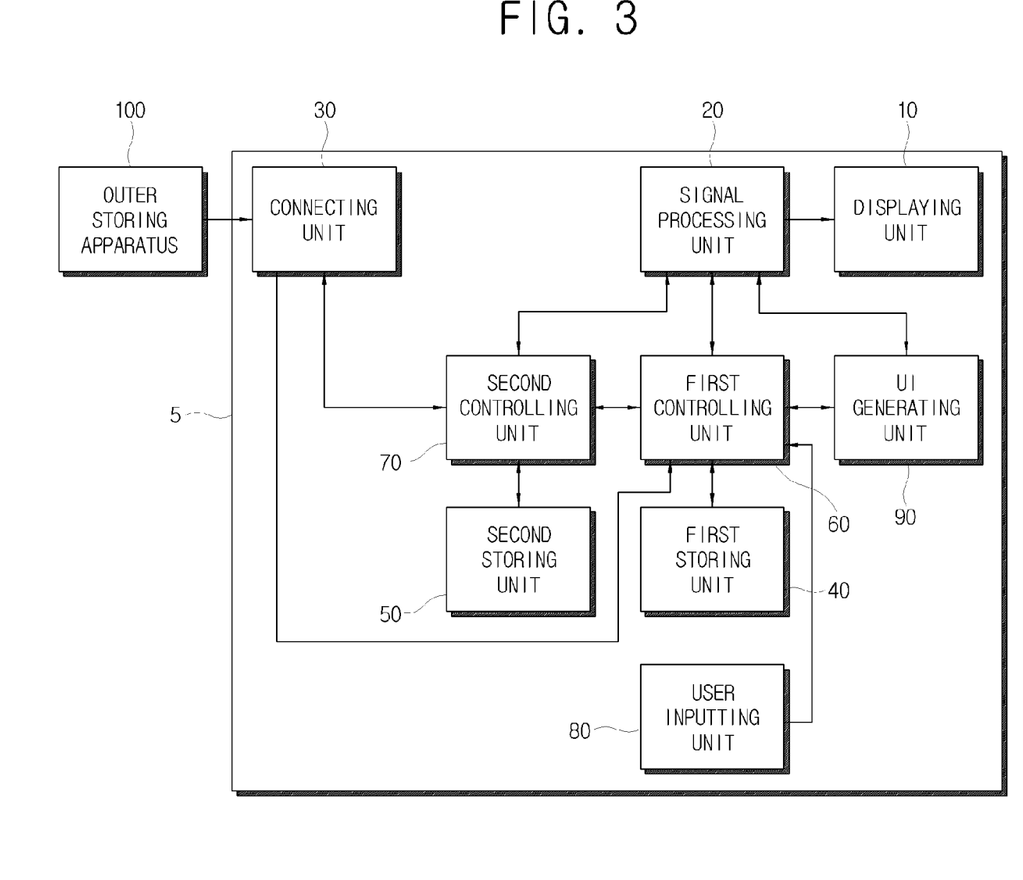

On the other hand, as shown in FIG. 3, the display apparatus 5 according to an exemplary embodiment of the present invention may further comprise a user inputting unit 80 and a UI generating unit 90.

The user inputting unit 80 receives a selection command for the first control program saved in the first storing unit 40 from the user. The second controlling unit 70 updates the first control program selected through the user inputting unit 80 to the first control program saved in the outer storing apparatus 100.

Also, as described above, if a plurality of the first control programs are saved in the first storing unit 40, only the first control program selected by the user may be updated. Therefore, irrespective of the version from the reference information of the first control program, the first control program saved in the first storing unit 40 can be replaced by the first control program selected by the user.

The UI generating unit 90 generates UI for selecting the first control program. The second controlling unit 70 receives a selection command for the first control program, which the user intends to update, through the UI generated by the UI generating unit 90. Then, the second controlling unit 70 updates the first control program selected by the user into the first control program saved in the outer storing apparatus 100.

Also, the UI generating unit 90 may further generate a UI indicating an update status of the plurality of first control programs. The second controlling unit 70 receives the reference information of the plurality of first control programs saved in the first storing unit 40, and compares the received reference information with the reference information saved in the outer storing apparatus 100. Then, the second controlling unit 70 controls the UI generating unit 90 to generate a UI which indicates the update status about whether it is required or not to update each of the plurality of first control programs saved in the first storing unit 40. The update status may comprise 'update completed', 'in updating', 'update impossible' and others. Therefore, the user may easily identify the first control program which needs to be updated among the plurality of first control programs saved in the first storing unit 40, and let the update be performed.

Hereinafter, a process of saving the control program in the display apparatus 5 according to an exemplary embodiment of the present invention is described with reference to FIG. 4.

Figure 4:
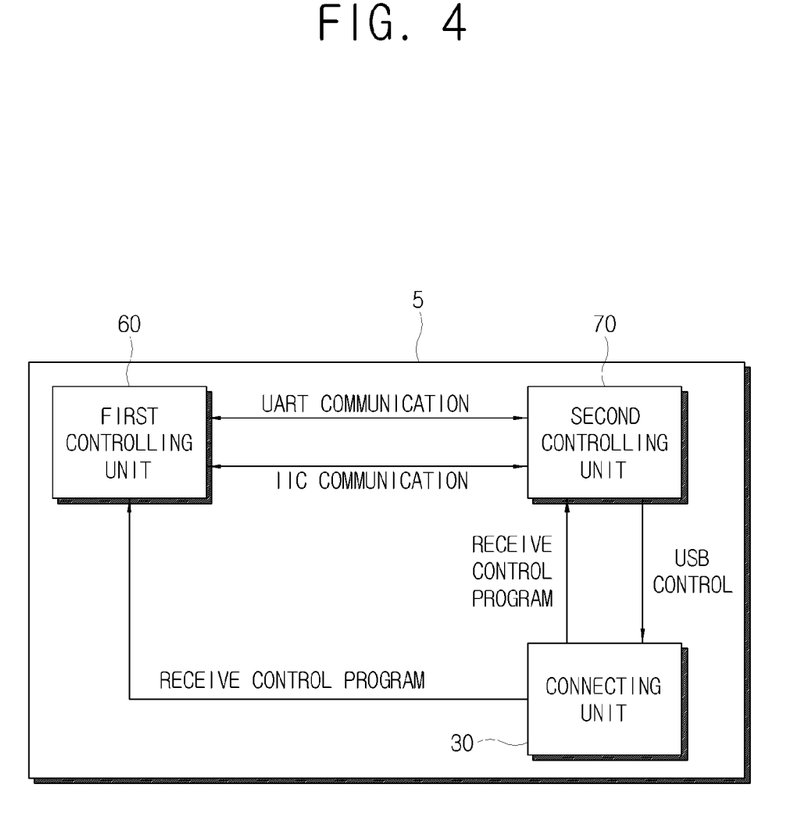
FIG. 4 is a block diagram to explain a process for saving a control program in the display apparatus according to an exemplary embodiment of the present invention.

As shown in FIG. 4, according to the display apparatus 5 of an exemplary embodiment of the present invention, the second controlling unit 70 may transmit the first control program saved in the outer storing apparatus 100 to the first controlling unit 60 by UART communication, and receive the reference information of the first control program for operating the first controlling unit 60 by IIC communication.

Firstly, if the power of the display apparatus 5 is on after the outer storing apparatus 100 is connected to the connecting unit 30 while the status of the power of the display apparatus 5 is off, the second controlling unit 70 receives the second control program for operating the second controlling unit 70 from the outer storing apparatus 100 and automatically performs updating. In this case, the second controlling unit 70 may inform the user whether updating is done by a beep or by other known methods in the art.

Also, the second controlling unit 70 determines if there is an input by the user for entering a Factory Mode to update the first control program. If the Factory Mode is entered by the user, the second controlling unit 70 decides whether to update the first control program or not from the user through the UI which is generated by the UI generating unit 90 for updating the first control program.

In the display apparatus 5, if the Factory Mode is entered by the user, the second controlling unit 70 may read the reference information of the first control program saved in the first storing unit and display the update status of the first control program through the UI. Then, if the user selects the first control program to update, the first control program saved in the first storing unit 40 may be updated into the first control program saved in the outer storing apparatus 100.

Figure 5:
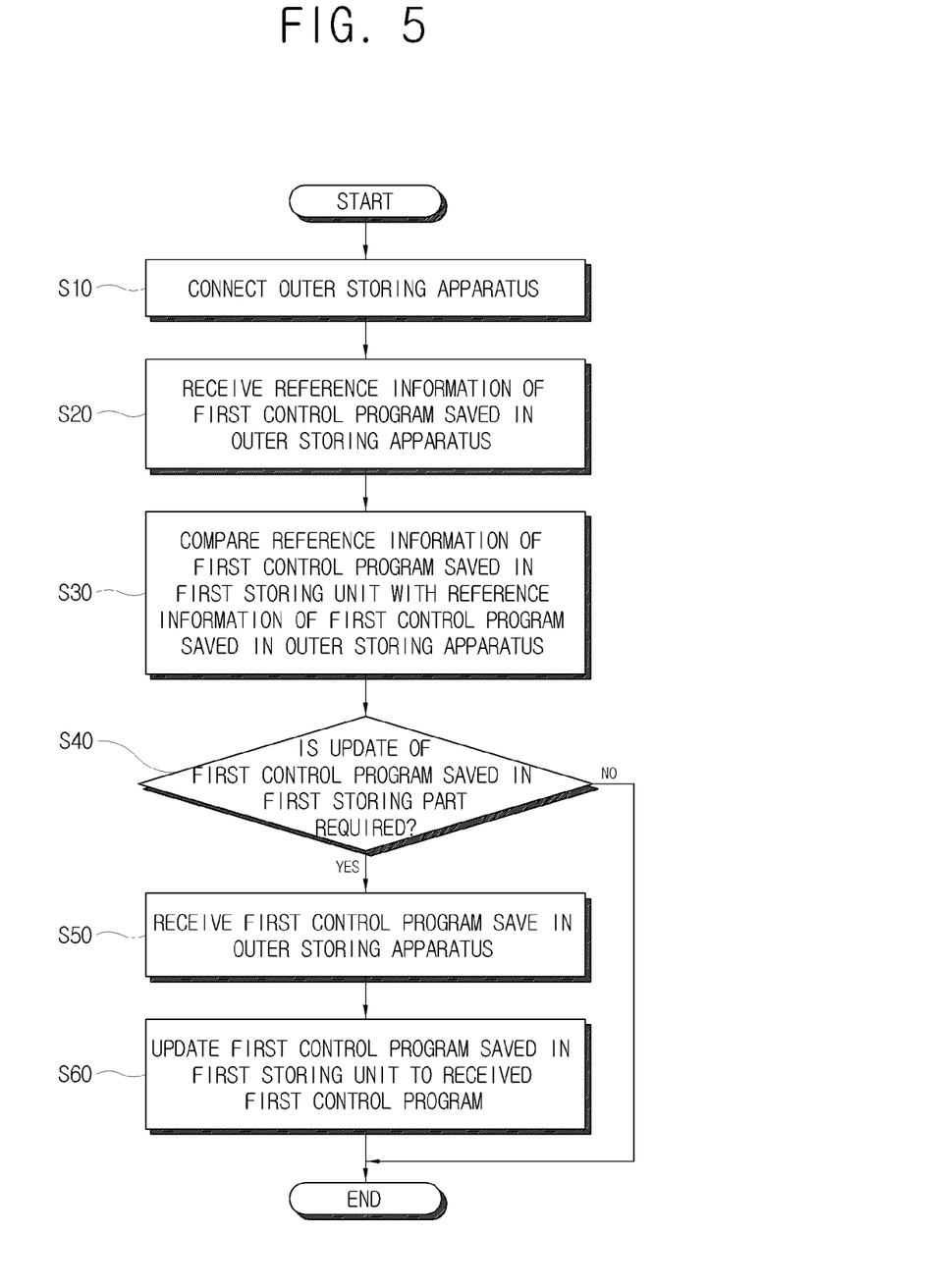
FIG. 5 is a flow diagram to explain an information update method of the display apparatus according to an exemplary embodiment of the present invention.

Hereinafter, an information update method of the display apparatus 5 according to an exemplary embodiment of the present invention is described with reference to FIG. 5.

Firstly, the outer storing apparatus 100 saving the first control program is connected (S10). The second controlling unit 70 receives the reference information of the first control program saved in the outer storing apparatus 100 (S20). The second controlling unit 70 compares the reference information of the first control program saved in the first storing unit 40 with the reference information of the first control program saved in the outer storing apparatus 100 (S30), and determines whether the first control program saved in the first storing unit 40 is required to be updated (S40).

The comparison (S30) may further comprise an operation to receive the reference information about the first control program saved in the first storing unit 40 from the first controlling unit 60 by Inter Integrated Circuit (IIC) communication.

If the second controlling unit 70 determines that the first control program saved in the first storing unit 40 is required to be updated, the second controlling unit 70 receives the first control program saved in the outer storing apparatus 100 (S50), and updates the first control program saved in the first storing unit 40 into the received first control program (S60).

According to another exemplary embodiment, the information update method of the display apparatus 5 may further comprise selecting, by the user, the first control program stored in the first storing unit 40 if the outer storing apparatus 100 is connected to the connecting unit 30. Also, the first control program selected by the user may be updated to the first control program saved in the outer storing apparatus 100.

As described above, the present invention provides a display apparatus which is relayed control program information necessary for a master micro controller and receives an appropriate control program from an outer storing apparatus to perform an update, and an information update method thereof.

Also, the present invention provides a display apparatus which receives all the control programs necessary for a master micro controller and a slave micro controller through a single connecting unit, so that the control programs can be easily updated without disassembling the display apparatus, and an information update method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a displaying unit;
a signal processing unit which performs signal processing for displaying images on the displaying unit;
a first controlling unit which controls the signal processing unit to perform signal processing;
a first storing unit which saves a first control program for operating the first controlling unit;
a connecting unit to which an outer storing apparatus is connected;
a second controlling unit which compares reference information related to the first control program saved in the first storing unit with reference information related to a first control program saved in the outer storing apparatus, and updates the first control program saved in the first storing unit to the first control program which is saved in the outer storing apparatus and received through the connecting unit if the first control program saved in the first storing unit needs to be updated; and
a second storing unit,
wherein the second controlling unit compares reference information related to a second control program saved in the second storing unit with reference information related to a second control program saved in the outer storing apparatus, and updates the second control program saved in the second storing unit to the second control program which is saved in the outer storing apparatus and received through the connecting unit if the second control program saved in the second storing unit needs to be updated, and
wherein the first storing unit and the second storing unit save micro controller unit (MCU) code data.

2. The display apparatus according to claim 1, wherein the second controlling unit receives the reference information related to the first control program saved in the first storing unit from the first controlling unit by Inter Integrated Circuit (IIC) communication.

3. The display apparatus according to claim 1, further comprising a user inputting unit,
wherein if the second controlling unit receives an input for updating the first control program saved in the first storing unit through the user inputting unit, the second controlling unit updates the first control program saved in the first storing unit to the first control program saved in the outer storing apparatus.

4. The display apparatus according to claim 3, further comprising a user interface (UI) generating unit which generates an update UI,
wherein the second controlling unit receives an update command for the first control program saved in the first storing unit through the update UI.

5. The display apparatus according to claim 4, wherein the UI generating unit further generates a status UI which indicates update status of the first control program, and the second controlling unit controls to receive the update command for the first control program from the user inputting unit through the status UI.

6. The display apparatus according to claim 1, wherein a protocol for the connecting unit to receive the first control program saved in the outer storing apparatus and the second control program saved in the outer storing apparatus comprises a universal serial bus (USB) protocol.

7. A display apparatus comprising:
a displaying unit;
a signal processing unit which performs signal processing for displaying images on the displaying unit;
a first controlling unit which controls the signal processing unit to perform signal processing;
a first storing unit which saves a first control program for operating the first controlling unit;
a connecting unit to which an outer storing apparatus is connected; and
a second controlling unit which receives a selection command for the first control program saved in the first storing unit, and updates the selected first control program into a first control program which is saved in the outer storing apparatus and received through the connecting unit; and
a second storing unit,
wherein the second controlling unit compares reference information related to a second control program saved in the second storing unit with reference information related to a second control program saved in the outer storing apparatus, and updates the second control program saved in the second storing unit into the second control program which is saved in the outer storing apparatus and received through the connecting unit if the second control program saved in the second storing unit needs to be updated, and
wherein the first storing unit and the second storing unit save micro controller unit (MCU) code data.

8. The display apparatus according to claim 7, wherein the second controlling unit receives reference information related to the selected first control program from the first controlling unit by Inter Integrated Circuit (IIC) communication.

9. The display apparatus according to claim 8, further comprising a user inputting unit,
wherein the second controlling unit receives the selection command through the user inputting unit.

10. The display apparatus according to claim 9, further comprising a user interface (UI) generating unit generating a selection UI through which the selected first control program is selected.

11. The display apparatus according to claim 10, wherein the UI generating unit further generates a status UI which indicates update status of the first control program saved in the first storing unit.

12. The display apparatus according claim 7, wherein a protocol for the connecting unit to receive the first control program saved in the outer storing apparatus and the second control program saved in the outer storing apparatus comprises a universal serial bus (USB) protocol.

13. An information update method of a display apparatus comprising a displaying unit, a signal processing unit which performs signal processing for displaying images on the displaying unit, and a first controlling unit which controls the signal processing unit, the method comprising:
connecting to an outer storing apparatus;
receiving reference information of a first control program saved in the outer storing apparatus;
comparing reference information related to a first control program saved in a first storing unit with the reference information of the first control program saved in the outer storing apparatus;
determining whether the first control program saved in the first storing unit needs to be updated as a result of the comparing;
receiving the first control program saved in the outer storing apparatus if the first control program saved in the first storing unit needs to be updated; and
updating the first control program saved in the first storing unit into the received first control program;
comparing reference information related to a second control program saved in a second storing unit with reference information related to a second control program saved in the outer storing apparatus, and
updating the second control program saved in the second storing unit to the second control program which is saved in the outer storing apparatus and received through the connecting unit if the second control program saved in the second storing unit needs to be updated, and
wherein the first storing unit and the second storing unit save micro controller unit (MCU) code data.

14. The information update method of a display apparatus according to claim 13, wherein the comparing the reference information further comprises receiving the reference information related to the first control program saved in the first storing unit from the first controlling unit by Inter Integrated Circuit (IIC) communication.

15. The information update method of a display apparatus according to claim 14, wherein the updating the first control program saved in the first storing unit comprises updating the first control program saved in the first storing unit into the first control program saved in the outer storing apparatus if there is an input for updating the first control program saved in the first storing unit from a user.

16. The information update method of a display apparatus according to claim 15, wherein the determining whether the first control program saved in the first storing unit needs to be updated comprises indicating update status of the first control program saved in the first storing unit.

17. The information update method of a display apparatus according to claim 16, wherein a protocol for receiving the first control program saved in the outer storing apparatus comprises a universal serial bus (USB) protocol.

18. An information update method of a display apparatus comprising a displaying unit, a signal processing unit which performs signal processing for displaying images on the displaying unit, and a first storing unit which saves a first control program for operating a first controlling unit which controls the signal processing unit, the method comprising:
connecting to an outer storing apparatus;
receiving a selection command for selecting the first control program saved in the first storing unit from a user; and
updating the selected first control program into a first control program saved in the outer storing apparatus,
comparing reference information related to a second control program saved in a second storing unit with reference information related to a second control program saved in the outer storing apparatus, and
updating the second control program saved in the second storing unit to the second control program which is saved in the outer storing apparatus if the second control program saved in the second storing unit needs to be updated, and
wherein the first storing unit and the second storing unit save micro controller unit (MCU) code data.

19. The information update method of a display apparatus according to claim 18, further comprising receiving reference information related to the selected first control program from the first controlling unit by Inter Integrated Circuit (IIC) communication.

* * * * *